(12) United States Patent
Lau et al.

(10) Patent No.: US 10,079,898 B2
(45) Date of Patent: Sep. 18, 2018

(54) SOFTWARE-DEFINED SENSORS

(71) Applicant: General Electric Company, Schenectady, NY (US)

(72) Inventors: Jean Lau, San Ramon, CA (US); Clifford A. Collins, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 285 days.

(21) Appl. No.: 15/186,627

(22) Filed: Jun. 20, 2016

(65) Prior Publication Data

US 2017/0366625 A1    Dec. 21, 2017

(51) Int. Cl.
*G06F 15/16* (2006.01)
*H04L 29/08* (2006.01)
*G06Q 10/08* (2012.01)

(52) U.S. Cl.
CPC ......... *H04L 67/18* (2013.01); *G06Q 10/0833* (2013.01); *H04L 67/12* (2013.01)

(58) Field of Classification Search
CPC ............................... H04L 67/18; H04L 67/12
USPC .................. 709/201–203, 217–219, 249
See application file for complete search history.

(56) References Cited

U.S. PATENT DOCUMENTS

| 7,058,826 B2* | 6/2006 | Fung | G06F 1/3203 709/219 |
|---|---|---|---|
| 7,324,804 B2* | 1/2008 | Hrastar | H04L 67/125 370/447 |
| 7,373,395 B2* | 5/2008 | Brailean | H04L 67/18 709/219 |
| 8,972,484 B2 | 3/2015 | Naphade et al. | |
| 2003/0063585 A1* | 4/2003 | Younis | H04L 45/04 370/331 |
| 2004/0049698 A1* | 3/2004 | Ott | G06F 21/554 726/23 |

(Continued)

OTHER PUBLICATIONS

Pandit, Puneel, "Scaling machine data analytics for the Internet of Things—introducing Glassbar SCALAR", [online]. © 2016 Glassbeam, Inc., [Retrieved on Jan. 14, 2016]. Retrieved from the Internet: <URL: http://www.glassbeam.com/scaling-machine-data-analytics-for-the-internet-of-things-introducing-glassbeam-scalar/ >, (Oct. 21, 2013), 2 pgs.

*Primary Examiner* — Bharat N Barot
(74) *Attorney, Agent, or Firm* — Fitch Even Tabin & Flannery LLP

(57) ABSTRACT

This disclosure provides for a system and method for managing network-connected industrial assets. The network-connected assets include a sensor controller affixed to a shipping container, where the sensor controller is communicatively coupled to one or more sensors. The one or more sensors monitor the shipping container and/or the contents stored therein. When located at an origin location, the sensor controller is communicatively coupled to a first Industrial Internet of Things (IIoT) machine via a first network. A client device can communicate with the sensor controller via the first IIoT machine. When the shipping container is shipped to a destination location, the sensor controller connects to a second network at the destination location. At the second network, another IIoT machine communicates with the sensor controller. The client device then receives sensor data from the sensor controller via the second IIoT machine.

20 Claims, 10 Drawing Sheets

(56) References Cited

U.S. PATENT DOCUMENTS

| | | | |
|---|---|---|---|
| 2011/0289133 A1* | 11/2011 | Shikano | H04L 67/12 709/202 |
| 2013/0211559 A1 | 8/2013 | Lawson et al. | |
| 2014/0006552 A1* | 1/2014 | Frei | H04L 67/12 709/217 |
| 2014/0303935 A1 | 10/2014 | Kamel et al. | |
| 2014/0337429 A1 | 11/2014 | Asenjo et al. | |
| 2015/0120359 A1 | 4/2015 | Dongieux | |
| 2015/0134733 A1 | 5/2015 | Maturana et al. | |
| 2015/0149134 A1 | 5/2015 | Mehta et al. | |
| 2015/0281453 A1 | 10/2015 | Maturana et al. | |

\* cited by examiner

ND SENSORS

TECHNICAL FIELD

The subject matter disclosed herein generally relates to configuring one or more sensors via a network-connected device, and in particular, to configuring one or more sensors deployed in a shipping container for monitoring the contents of the shipping container as it travels from location to a destination location.

BACKGROUND

Software-implemented processes have a direct influence over many aspects of society. Digital consumer companies are disrupting the old guard and changing the way we live and do business in fundamental ways. For example, recent companies have disrupted traditional business models for taxis, hotels, and car rentals by leveraging software-implemented processes and interfaces to create new technical solutions that better address consumers' needs and wants.

An Internet of Things (IoT) has developed over at least the last decade, representing a network of physical objects or "things" with embedded software that enables connectivity with other similar or dissimilar things. In some examples, connected things can exchange information, or can receive remote instructions or updates, for example via the Internet. Such connectivity can be used to augment a device's efficiency or efficacy, among other benefits.

Similar to the way that consumer device connectivity is changing consumers' lifestyles, embedded software and connectivity among industrial assets presents an opportunity for businesses to alter and enhance operations, for example, in fields of manufacturing, energy, agriculture, or transportation, among others. This connectivity among industrial assets is sometimes referred to as the Industrial Internet of Things (IIoT).

Industrial Internet applications are typically isolated, one-off implementations. However, these implementations limit the opportunities to create economies of scale, and fall short of unlocking the potential of connecting multiple machines and data around the globe.

BRIEF DESCRIPTION OF THE DRAWINGS

Some embodiments are illustrated by way of example and not limitation in the figures of the accompanying drawings.

DETAILED DESCRIPTION

Figure 1:
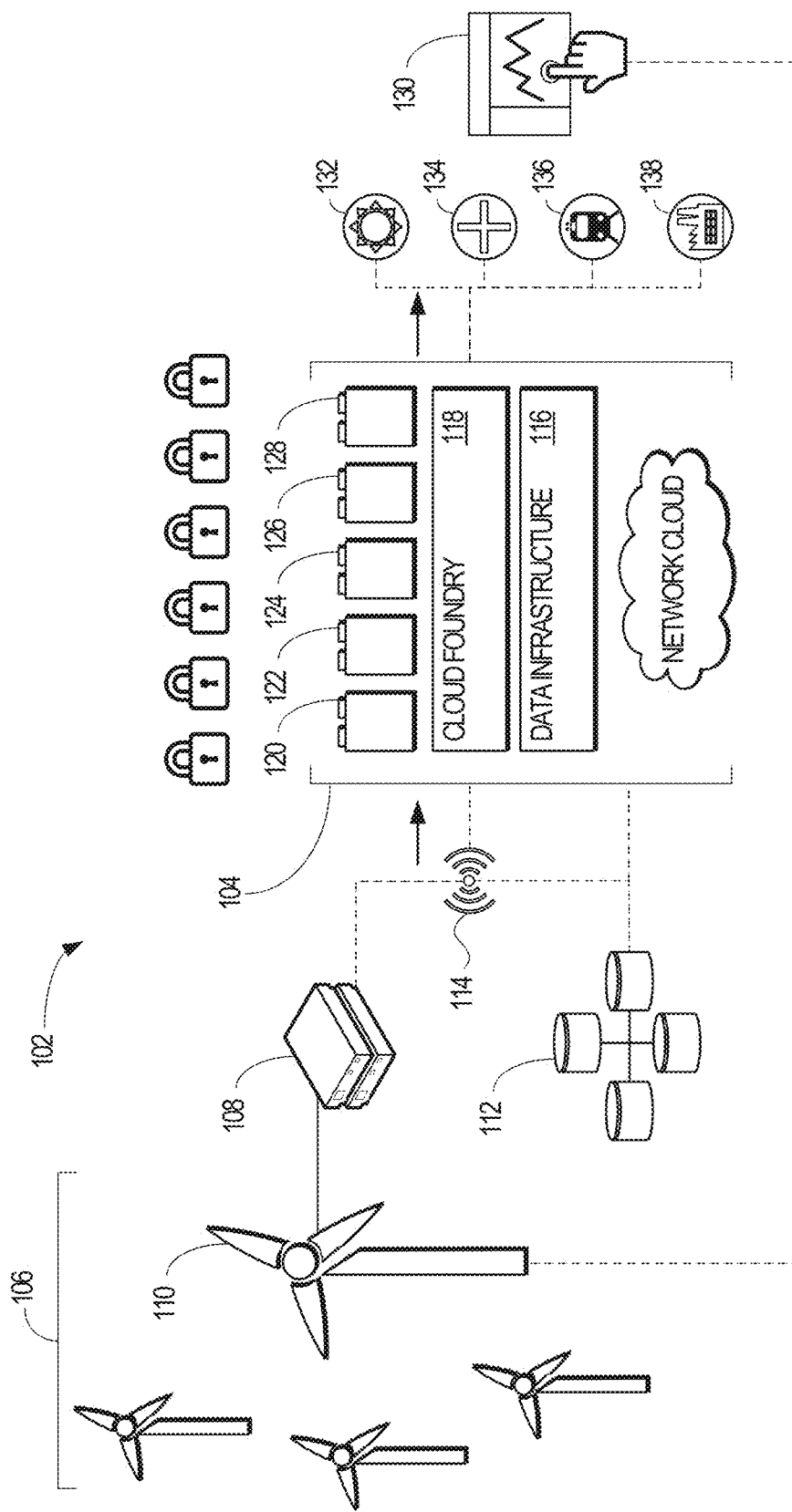
FIG. 1 is a block diagram illustrating an asset management platform, according to an example embodiment.

This disclosure provides a system, method, and machine-readable medium for configuring one or more sensors deployed in a shipping container for monitoring the contents of the shipping container as it travels from an origin location to a destination location, where the one or more sensors are controlled by a microcontroller or other processor(s) in communication with, or connected to, an IIoT machine. As used herein, the term "sensor controller" refers to the microcontroller or other processor(s) that configures and/or controls the one or more sensors communicatively coupled to the microcontroller or other processor(s). The sensor controller receives sensor configuration data for the one or more sensors communicatively coupled to the microcontroller or other processor, and configures the one or more sensors according to the received sensor configuration data. The sensor controller may receive the sensor configuration data from a client device in communication with the sensor controller via an IIoT machine.

Further still, the sensor controller is configured with network connection data that instructs the sensor controller how to connect to a first network located at an origin location and a second network located at a destination location. Upon arriving at the destination location, the sensor controller may connect to the second network, at which time, the client device may then retrieve sensor data collected by the sensor controller during transit from the origin location to the destination location. The technical benefit provided by this disclosure is that a user of the client device can connect to the sensor controller from a remote location (e.g., the origin location) and obtain sensor data that informs the user whether there were any alerts or issues that came up during the transit of the sensor controller. A further technical benefit that this disclosure provides is the more efficient management of limited resources that are available to the sensors and sensor controller during the transit from the origin location to the destination location.

Accordingly, in one embodiment, this disclosure provides a sensor controller that includes a machine-readable medium storing computer-executable instructions, and at least one hardware processor communicatively coupled to the machine-readable medium that, when the computer-executable instructions are executed, configures the sensor controller to receive sensor configuration data via a first network located at a first geographic location, the sensor configuration data specifying one or more sensors to be active during transit from the first geographic location to a second geographic location, receive receiving network connection data specifying one or more network credentials for connecting to a second network located at a second geographic location, and monitor the one or more sensors specified as active by the sensor configuration data. The sensor controller is also configured to receive sensor data from the monitored one or more sensors, connect to the second network in response to a determination that the second geographic location has been reached, and transmit the received sensor data to a client device communicatively coupled to the first network.

This disclosure also describes a method that includes receiving sensor configuration data at a first network located at a first geographic location, the sensor configuration data specifying one or more sensors to be active during transit from the first geographic location to a second geographic location, receiving network connection data specifying one or more network credentials for connecting to a second network located at a second geographic location, and monitoring the one or more sensors specified as active by the sensor configuration data. The method also includes receiving sensor data from the monitored one or more sensors, connecting to the second network in response to a determination that the second geographic location has been reached, and transmitting the received sensor data to a client device communicatively coupled to the first network.

Furthermore, this disclosure provides for a machine-readable medium comprising computer-executable instructions that, when executed by at least one hardware processor, causes a system to perform a plurality of operations, the operations comprising receiving sensor configuration data at a first network located at a first geographic location, the sensor configuration data specifying one or more sensors to be active during transit from the first geographic location to a second geographic location, receiving network connection data specifying one or more network credentials for connecting to a second network located at a second geographic location, and monitoring the one or more sensors specified as active by the sensor configuration data. The plurality of operations also include receiving sensor data from the monitored one or more sensors, connecting to the second network in response to a determination that the second geographic location has been reached, and transmitting the received sensor data to a client device communicatively coupled to the first network, Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Industrial equipment or assets, generally, are engineered to perform particular tasks as part of a business process. For example, industrial assets can include, among other things and without limitation, manufacturing equipment on a production line, wind turbines that generate electricity on a wind farm, healthcare or imaging devices (e.g., X-ray or MRI systems) for use in patient care facilities, or drilling equipment for use in mining operations. The design and implementation of these assets often takes into account both the physics of the task at hand and the environment in which such assets are configured to operate.

Low-level software and hardware-based controllers have long been used to drive industrial assets. However, with the rise of inexpensive cloud computing, increasing sensor capabilities, and decreasing sensor costs, as well as the proliferation of mobile technologies, there are new opportunities to enhance the business value of some industrial assets.

While progress with industrial equipment automation has been made over the last several decades, and assets have become 'smarter,' the intelligence of any individual asset pales in comparison to intelligence that can be gained when multiple smart devices are connected together. Aggregating data collected from or about multiple assets can enable users to improve business processes (for example, by improving effectiveness of asset maintenance or improving operational performance).

In an example, an industrial asset can be outfitted with one or more sensors configured to monitor an asset's operations or conditions. The date from the one or more sensors can be recorded or transmitted to a cloud-based or other remote computing environment. By bringing such data into a cloud-based computing environment, new software applications can be constructed, and new physics-based analytics can be created. Insights gained through analysis of such data can lead to enhanced asset designs, or to enhanced software algorithms for operating the same or similar asset at its edge, that is, at the extremes of its expected or available operating conditions.

Systems and methods described herein are configured for managing industrial assets. In an example, information about industrial assets and their use conditions, such as gathered from sensors embedded at or near industrial assets themselves, can be aggregated, analyzed, and processed in software residing locally or remotely from the assets. In an example, applications configured to operate at a local or remote processor can be provided to optimize an industrial asset for operation in a business context. In an example, a development platform can be provided to enable end-users to develop their own applications for interfacing with and optimizing industrial assets and relationships between various industrial assets and the cloud. Such end-user-developed applications can operate at the device, fleet, enterprise, or global level by leveraging cloud or distributed computing resources.

The systems and methods for managing industrial assets can include or can be a portion of an (IIoT. In an example, an IIoT connects industrial assets, such as turbines, jet engines, and locomotives, to the Internet or cloud, or to each other in some meaningful way. The systems and methods described herein can include using a "cloud" or remote or distributed computing resource or service. The cloud can be used to receive, relay, transmit, store, analyze, or otherwise process information for or about one or more industrial assets.

In an example, a cloud computing system includes at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, analytics, data storage, security, or some other function, as further described herein.

In an example, a manufacturer of industrial assets can be uniquely situated to leverage its understanding of industrial assets themselves, models of such assets, and industrial operations or applications of such assets, to create new value for industrial customers through asset insights. In an example, an asset management platform (AMP) can incorporate a manufacturer's asset knowledge with a set of development tools and best practices that enables asset users to bridge gaps between software and operations to enhance capabilities, foster innovation, and ultimately provide economic value.

In an example, an AMP includes a device gateway that is configured to connect multiple industrial assets to a cloud computing system. The device gateway can connect assets of a particular type, source, or vintage, or the device gateway can connect assets of multiple different types, sources, or vintages. In one embodiment, the multiple connected assets belong to different asset communities (e.g., logical and/or physical groups of assets that are assigned by the end user and/or by the AMP), and the asset communities are located remotely or locally to one another. The multiple connected assets are in use (or non-use) under similar or dissimilar environmental conditions, or can have one or more other common or distinguishing characteristics. For example, information about environmental or operating conditions of an asset or an asset community can be shared with the AMP. Using the AMP, operational models of one or more assets can be improved and subsequently leveraged to optimize assets in the same community or in a different community.

FIG. 1 is a block diagram illustrating an AMP 102, according to an example embodiment. In various embodiments, one or more portions of the AMP 102 reside in an asset cloud computing system 104, in a local or sandboxed environment, or are distributed across multiple locations or devices. The AMP 102 may be configured to perform any one or more of data acquisition, data analysis, or data exchange with local or remote assets or with other task-specific processing devices.

In one embodiment, the AMP 102 includes an asset community 106 that is communicatively coupled with the asset cloud computing system 104. An IIoT machine 108 is communicatively coupled with one or more of the assets of the asset community 106. The IIoT machine 108 receives information from, or senses information about, at least one asset member 110 of the asset community 106, and configures the received information for exchange with the asset cloud computing system 104. In one embodiment, the IIoT machine 108 is communicatively coupled to the asset cloud computing system 104 or to an enterprise computing system 112 via a communication gateway 114. The communication gateway 114 may use one or more wired and/or wireless communication channels that extends at least from the IIoT machine 108 to the asset cloud computing system 104.

In one embodiment, the asset cloud computing system 104 is configured with several different and/or similar layers. For example, the asset cloud computing system 104 may include a data infrastructure layer 116, a Cloud Foundry layer 118, and one or more modules 120-128 for providing various functions. In one embodiment, the data infrastructure layer 116 provides applications and/or services for accessing data maintained by the asset cloud computing system 104. In addition, the Cloud Foundry layer 118 executes Cloud. Foundry, which is an Open Source platform-as-a-service (PaaS) that supports multiple developer frameworks and an ecosystem of application services. Cloud Foundry facilitates the development and scaling of various applications. Cloud Foundry is available from Pivotal Software, Inc., which is located in Palo Alto, Calif.

Furthermore, and as shown in FIG. 1, the asset cloud computing system 104 includes an asset module 120, an analytics module 122, a data acquisition module 124, a data security module 126, and an operations module 128. Each of the modules 120-128 includes or uses a dedicated circuit, or instructions for operating a general purpose processor circuit, to perform the respective functions. In an example, the modules 120-128 are communicatively coupled in the asset cloud computing system 104 such that information from one module can be shared with another. The modules 120-128 may be co-located at a designated datacenter or other facility, or the modules 120-128 may be distributed across multiple different locations.

The asset cloud computing system 104 may be accessible and/or provide information to one or more industrial applications and/or data centers 132-138. For example, the cloud computing system 104 may provide information to one or more devices in the energy industry 132, one or more devices in the healthcare industry 134, one or more devices in the transportation industry 136, and/or one or devices that are connected as an IoT for industry 138. In this manner, the asset cloud computing system 104 becomes a distribution center for various industry devices 132-138 such that any one device may access the asset cloud computing system 104 for information about one or more assets in the asset community 106.

Furthermore, and in one embodiment, the AMP 102 is communicatively coupled with an interface device 130. The interface device 130 may be configured for data communication with one or more of the IIoT machine 108, the communication gateway 114, or the asset cloud computing system 104. The interface device 130 may be used to monitor or control one or more assets of the asset community 106. For example, and in one embodiment, information about the asset community 106 is presented to an operator at the interface device 130. The information about the asset community 106 may include, but is not limited to, information from the machine 108, information from the asset cloud computing system 104, information from the enterprise computing system 112, or combinations thereof. In one embodiment, the information from the asset cloud computing system 104 includes information about the asset community 106 in the context of multiple other similar or dissimilar assets, and the interface device 130 may include options for optimizing one or more members of the asset community 106 based on analytics performed at the asset cloud computing system 104.

One or more of the assets of the asset community 106 may be configurable by way of one or more parameters being updated by the interface device 130. For example, where an asset 110 is a wind turbine, an operator of the interface device 130 may request that a parameter for the wind turbine 110 be updated, and that parameter update is pushed to the wind turbine 110 via one or more of the devices of the AMP 102, such as the asset cloud computing system 104, the communication gateway 114, and the IIoT machine 108, or combinations thereof.

Further still, the interface device 130 may communicate with the enterprise computing system 112 to provide enterprise-wide data about the asset community 106 in the context of other business or process data. For example, choices with respect to asset optimization can be presented to an operator in the context of available or forecasted raw material supplies or fuel costs. In an example, choices with respect to asset optimization can be presented to an operator in the context of a process flow to identify how efficiency gains or losses at one asset can impact other assets. In an example, one or more choices described herein as being presented to a user or operator can alternatively be made automatically by a processor circuit according to earlier-specified or programmed operational parameters. In an example, the processor circuit can be located at one or more of the interface device 130, the asset cloud computing system 104, the enterprise computing system 112, or elsewhere.

In one embodiment, the asset community 106 includes one or more wind turbines as assets, such as the wind turbine 110. A wind turbine is a non-limiting example of a type of industrial asset that can be a part of, or in data communication with, the AMP 102. In another embodiment, the asset community 106 includes one or more healthcare-related devices as assets, such as imaging devices (e.g., an MRI scanner), biometric monitoring devices (e.g., an EEG monitor), and other such devices or combination of devices.

The asset community 106 may include assets from different manufacturers or vintages. The various assets (e.g., wind turbines, generators, solar panels, hydroelectric turbines, MRI scanners, buses, railcars, etc.) of the asset community 106 can belong to one or more different asset communities, and the asset communities can be located locally or remotely from one another. For example, the members of the asset community 106 can be co-located within a single community (e.g., a wind farm), or the members can be geographically distributed across multiple different communities (e.g., one or more geographically disparate wind farms). Furthermore, the one or more assets of the asset community 106 may be in use (or non-use) under similar or dissimilar environmental conditions, or may have one or more other common or distinguishing characteristics.

The asset community 106 is also communicatively coupled to the asset cloud computing system 104. In one embodiment, the AMP 102 includes a communication gateway 114 that communicatively couples the asset community 106 to the asset cloud computing system 104. The communication gateway 114 may further couple the asset cloud computing system 104 to one or more other assets and/or asset communities, to the enterprise computing system 112, or to one or more other devices. The AMP 102 thus represents a scalable industrial solution that extends from a physical or virtual asset (e.g., the industrial asset 110) to a remote asset cloud computing system 104. The asset cloud computing system 104 optionally includes a local, system, enterprise, or global computing infrastructure that can be optimized for industrial data workloads, secure data communication, and compliance with regulatory requirements.

The asset cloud computing system 104 is configured to collect information and/or metrics about one or more assets and/or asset communities 106. In one embodiment, the information from the asset 110, about the asset 110, or sensed by the asset 110 is communicated from the asset 110 to the data acquisition module 124 in the asset cloud computing system 104. In one embodiment, an external sensor, such as a temperature sensor, gyroscope, infrared sensor, accelerometer, and the like, is configured to sense information about a function of the asset 110, or to sense information about an environmental condition at or near the asset 110. The external sensor may be further configured for data communication with the communication gateway 114 (e.g., via one or more wired and/or wireless transmission mediums) and the data acquisition module 124. In one embodiment, the asset cloud computing system 104 is configured to use the sensor information in its analysis of one or more assets, such as using the analytics module 122. As discussed below with reference to FIGS. 3-9, a user may use a client device, such as the interface device 130, to request this monitored data for display on the interface device 130.

An operational model for the asset 110 may be employed by the asset cloud computing system 104. In one embodiment, the asset cloud computing system 104 invokes the asset module 120 to retrieve the operational model for the asset 110. The operational model may be stored in one or more locations, such as in the asset cloud computing system 104 and/or the enterprise computing system 112.

In addition, the asset cloud computing system 104 is configured to use the analytics module 122 to apply information received about the asset 110 or its operating conditions (e.g., received via the communication gateway 114) to or with the retrieved operational model. Using a result from the analytics module 122, the operational model may be updated, such as for subsequent use in optimizing the asset 110 or one or more other assets, such as one or more assets in the same or different asset community. In one embodiment, information and/or metrics about the asset 110 is used by the asset cloud computing system 104 to inform selection of an operating parameter for a remotely located asset that belongs to a different second asset community.

The IIoT machine 108 is configured to communicate with the asset community 106 and/or the asset cloud computing system 104. Accordingly, in one embodiment, the IIoT machine 108 includes a software layer configured for communication the asset community 106 and the asset cloud computing system 104. Further still, the IIoT machine 108 may be configured to execute an application locally at the asset 110 of the asset community 106. The IIoT machine 108 may be configured for use with or installed on gateways, industrial controllers, sensors, and other components.

In one embodiment, the IIoT machine 108 is implemented as a software stack that can be embedded into hardware devices such as industrial control systems or network gateways. The software stack may include its own software development kit (SDK). The SDK includes functions that enable developers to leverage the core features described below.

One responsibility of the IIoT machine 108 is to provide secure, bi-directional cloud connectivity to, and management of, industrial assets, while also enabling applications (analytical and operational services) at the edge of the IIoT. The latter permits the delivery of near-real-time processing in controlled environments. Thus, the IIoT machine 108 connects to the asset cloud computing system 104 and communicates with the various modules 120-128. This allows other computing devices, such as the interface device 130, running user interfaces/mobile applications to perform various analyses of either the industrial asset 110 or other assets within the asset community 106.

In addition to the foregoing, the IIoT machine 108 also provides security, authentication, and governance services for endpoint devices. This allows security profiles to be audited and managed centrally across devices, ensuring that assets are connected, controlled, and managed in a safe and secure manner, and that critical data is protected.

Figure 2:
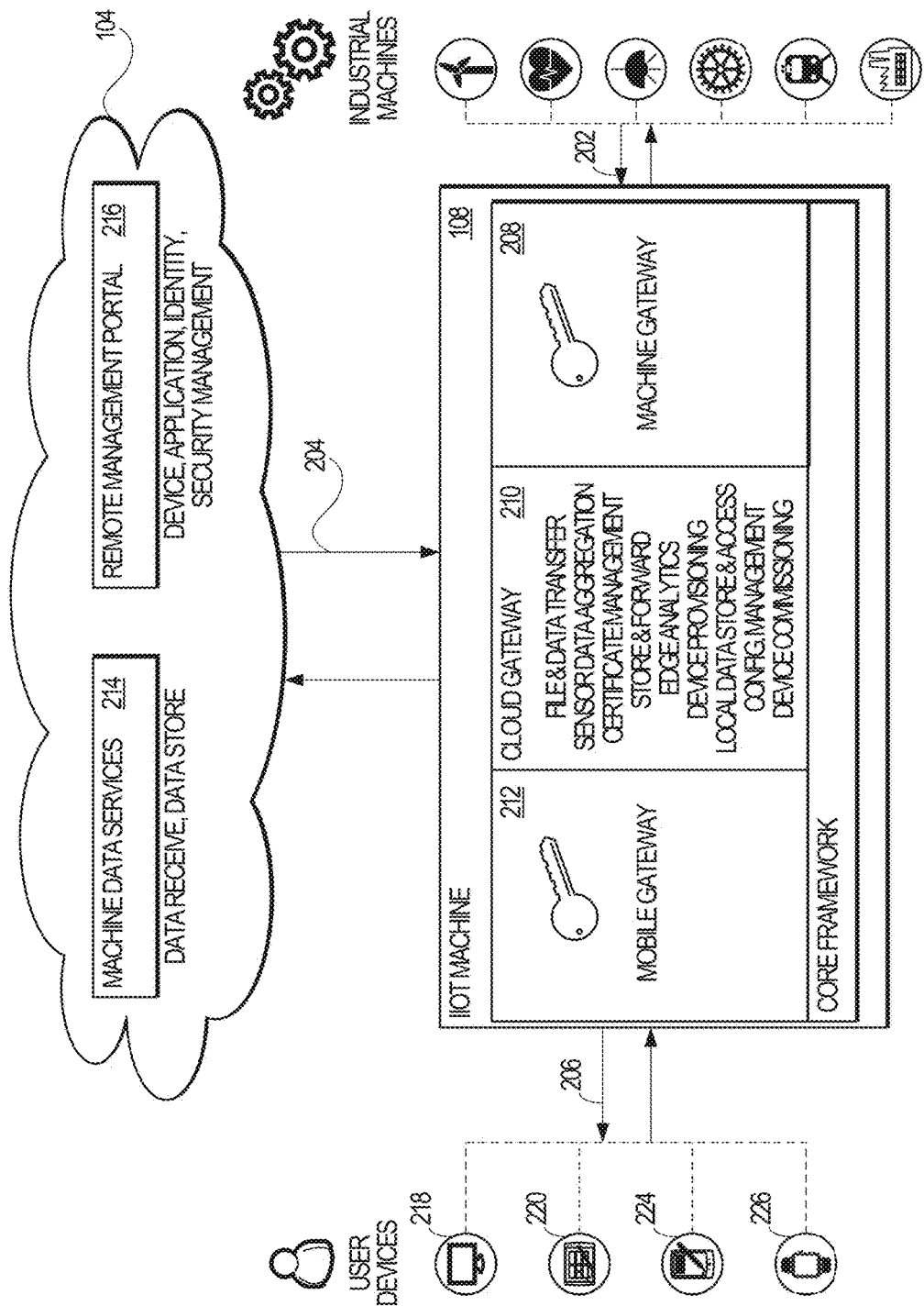
FIG. 2 is a block diagram illustrating different edge connectivity options that an IIoT machine provides, in accordance with an example embodiment.

In order to meet requirements for industrial connectivity, the IIoT machine 108 can support gateway solutions that connect multiple edge components via various industry standard protocols. FIG. 2 is a block diagram illustrating different edge connectivity options that an IIoT machine 108 provides, in accordance with an example embodiment. There are generally three types of edge connectivity options that an IIoT machine 108 provides: machine gateway (M2M) 202, cloud gateway (M2DC) 204, and mobile gateway (M2H) 206.

Many assets may already support connectivity through industrial protocols such as Open Platform Communication (OPC)-UA or ModBus. A machine gateway component 208 may provide an extensible plug-in framework that enables connectivity to assets via M2M 202 based on these common industrial protocols.

A cloud gateway component 210 connects an IIoT machine 108 to the asset cloud computing system 104 via M2DC. As discussed above, the asset cloud computing system 104 provides various machine data services 214 and a remote management portal 216 for managing various connected industrial assets and/or the IIoT machine 108.

In one embodiment, the IIoT machine 108 is configured with a mobile gateway component 212 that facilitates bypassing asset cloud computing system 104 and establishing a direct connection to an industrial asset (e.g., the industrial asset 110). In some circumstances, the direct connection is used in maintenance scenarios. When service technicians are deployed to maintain or repair machines, they can connect directly from their machine (e.g., interface device 130) to understand the asset's operating conditions and perform troubleshooting. In certain industrial environments, where connectivity can be challenging, the ability to bypass the cloud and create this direct connection to the asset is helpful and technically beneficial.

The IIoT machine 108 may be deployed in various different ways. For example, the IIoT machine 108 may be deployed on the communication gateway 114, on various controllers communicatively coupled to one or more assets, or on sensors that monitor the industrial assets or the asset community 106. Where the IIoT machine 108 is deployed directly on one or more machine controllers, this deployment decouples the machine software from the machine hardware, allowing connectivity, upgradability, cross-compatibility, remote access, and remote control. It also upgrades industrial and commercial assets, which have traditionally operated standalone or in very isolated networks, to be connected directly to the asset cloud computing system 104 for data collection and live analytics.

Where the IIoT machine 108 is deployed on one or more sensors that collect and/or monitor data from one or more of the industrial assets, the sensors collect asset and environmental data, which is then communicated to the asset cloud computing system 104 for storage, analysis, and visualization.

Customers or other users of the asset cloud computing system 104 may create applications to operate, or reside on, the asset cloud computing system 104. While the applications reside on, or are executed by, the asset cloud computing system 104, these applications may leverage monitored data (or other metrics) gathered by IIoT machines (e.g., IIoT machine 108) that are in communication with one or more industrial assets or asset communities. In summary, the asset cloud computing system 104 contributes to the IIoT by providing a scalable cloud infrastructure that serves as a basis for PaaS, which is what developers use to create Industrial Internet applications for use in the IIoT.

In one embodiment, and as shown in FIG. 2, various user devices 218-226 communicate with the IIoT machine 108 via the mobile gateway 212. The user devices 218-226 may be considered various embodiments of the interface device 130. However, in alternative embodiments, the user devices 218-226 communicate with the IIoT machine 108 via the asset cloud computing system 104, such as through one or more of the modules 120-128. Where the user devices 218-226 access data and/or services provided by the asset cloud computing system 104 and/or IIoT machine 108, the user devices 218-226 are considered client devices.

The user devices 218-226 may comprise, but are not limited to, mobile phones, desktop computers, laptops, portable digital assistants (PDAs), smart phones, tablets, ultrabooks, netbooks, wearable devices (e.g., smartwatch or assisted-vision devices), multi-processor systems, microprocessor-based or programmable consumer electronics, or any other communication device that a user may utilize to access the asset cloud computing system 104 or the IIoT machine 108. In some embodiments, the user devices 218-226 include a display module (not shown) to display information (e.g., in the form of user interfaces). In further embodiments, the user devices 218-226 include one or more of touch screens, accelerometers, gyroscopes, cameras, microphones, global positioning system (GPS) devices, and so forth.

Figure 3:
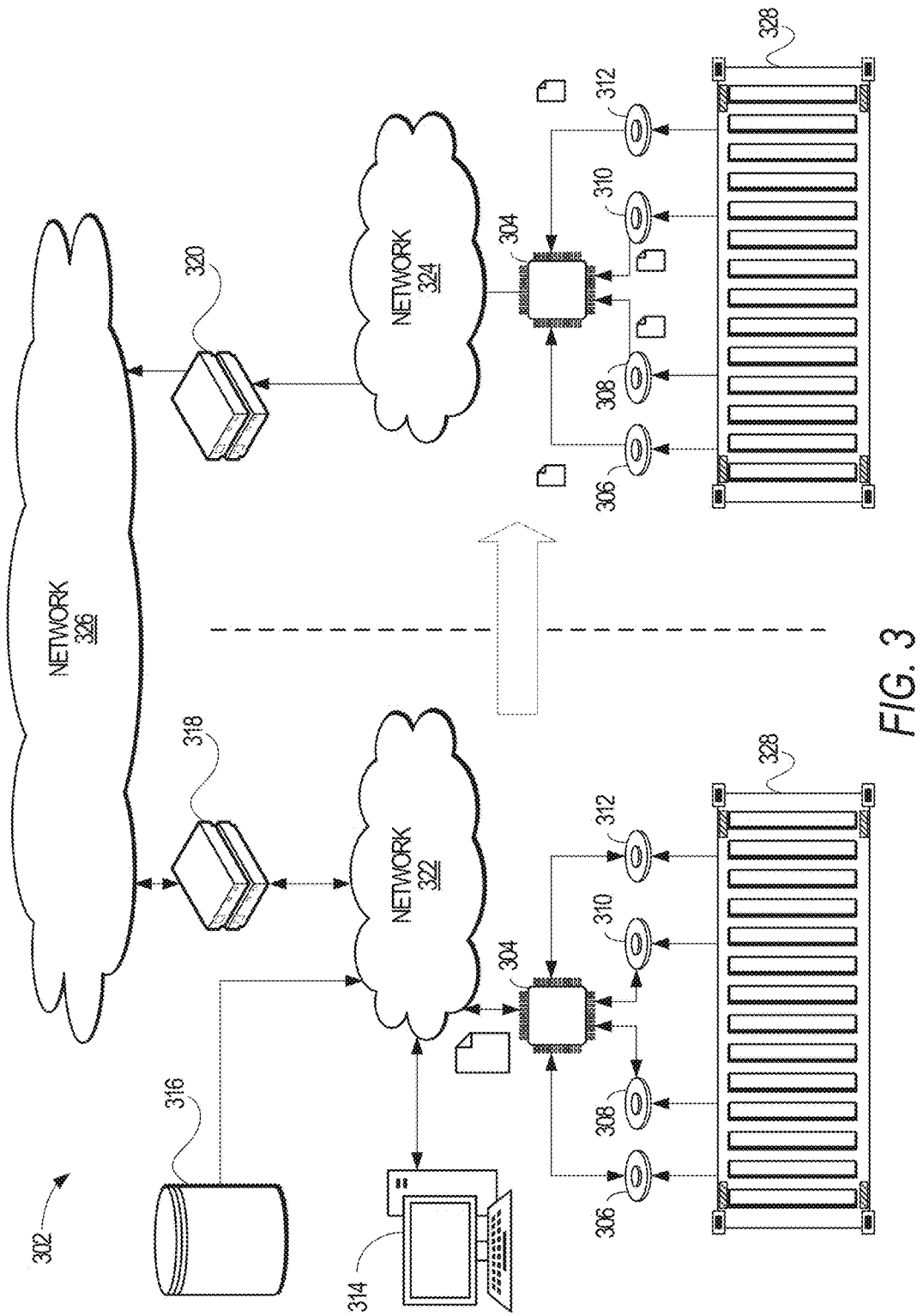
FIG. 3 illustrates a sensor controller in communication with different IIoT machines depending on whether the sensor controller is located at an origin location or a destination location, according to an example embodiment.

FIG. 3 illustrates a sensor controller 304 in communication with different IIoT machines 318,320 depending on whether the sensor controller 304 is located at an origin location or a destination location, according to an example embodiment. The sensor controller 304 is one example of an industrial asset (e.g., the industrial asset 110), and is in communication with an IIoT machine 318, 320 via networks 322,324, respectively. The IIoT machines 318,320 are examples of the IIoT machine 108 of FIG. 1. The sensor controller 304 communicates with the IIoT machine 318 via the network 322 when the sensor controller 304 is located at the origin location and communicates with the IIoT machine 320 via the network 324 when the sensor controller 304 is located at (or believes it is located at) the destination location. The networks 322,24 may be any combination of wired and/or wireless networks, such as a LAN using one or more wired and/or wireless connections (e.g., Ethernet and/or 802.11b/g/n). The IIoT machines 318,320 are further accessible via a network 326, which may be implemented as a Wide Area Network (e.g., the Internet).

As discussed below, the sensor controller 304 receives instructions and configuration data from a client device 314, which is an example of a user device 218-226. The client device 314 is communicatively coupled to the sensor controller 304 via the network 322 when the sensor controller 304 is located at the origin location. Similarly, the client device 314 may communicate with the sensor controller 304 via the networks 324,326 and the IIoT machine 320 when the sensor controller 304 is located at the destination location.

The sensor controller 304 may be affixed to, or integrated into, a shipping container 328, which is used to transport goods from the origin location to the destination location. The sensor controller 304 may also be communicatively coupled to various sensors 306-312, which monitor the shipping container 328 and/or the contents held therein. Examples of sensors 306-312 include, but are not limited to, a temperature sensor, a humidity sensor, a gyroscope or vibration sensor, a tilt sensor, an accelerometer, and other such sensors or combination of sensors. The sensors 306-312 may acquire measurements (e.g., raw data) of conditions inside and/or outside of the shipping container 328, depending on the mounting point of each of the sensors 306-312. The sensors 306-312 provide the acquired measurements to the sensor controller 304, which may then massage or otherwise transform the raw data into a format consumable by the client device 314 and/or into a human-readable format.

In addition, and in one embodiment, depending on the capabilities of the mounted sensors 306-312, the sensors 306-312 may be programmed to provide an alert, or raise an alarm with, the sensor controller 304 in response to an acquired measurement. For example, the sensors 306-312 may each be configured with high and/or low thresholds (or a range of thresholds), and the acquired measurements may each be compared with such thresholds. Alternatively, and/or additionally, the sensor controller 304 may be programmed with one or more thresholds corresponding to the sensors 306-312, and may be further configured to record an alarm when the measurements acquired by the sensors 306-312 are determined to be outside of the range defined by the corresponding thresholds. In this manner, the sensor controller 304 and/or the sensors 306-312 maintain a record of instances where measurements within or outside of the shipping container 328 were higher or lower than expected values.

Further still, and as discussed below with reference to FIG. 4, the sensor controller 304 may correlate the acquired measurements with Global Positioning System (GPS) coordinates and/or a time value (e.g., measured relative to the time when the sensor controller 304 was activated or as an absolute value). The GPS coordinates may be obtained from one or more of the sensors 306-312 communicatively coupled to the sensor controller 304. The time value may be obtained from an internal clock onboard the sensor controller 304. By correlating the measurements acquired by the sensors 306-312 with the GPS coordinates and/or the time value, an administrator or owner of the shipping container 328 can pinpoint or better identify when a problem may have occurred during the transport of the shipping container 328.

One of the challenges posed in equipping the shipping container 328 with the sensors 306-312 is that there are limited resources available to the sensors 306-312 for monitoring the contents of the shipping container 328 or the shipping container 328. Specifically, power management can be problematic, especially where one or more of the sensors 306-312 has a high power draw. Accordingly, one role of the sensor controller 304 is to regulate which of the one or more sensors 306-312 are active during the transit of the shipping container 328. In this regard, a user of the client device 314 can communicate with the sensor controller 304 and provide sensor configuration data that informs the sensor controller 304 which of the one or more sensors 306-312 are to be active. In one embodiment, the user of the client device 314 communicates with a database 316, which includes a shipping manifest of the various shipping containers being transported from the origin location to the destination, including the shipping container 328.

The database 316 is further configured to store an association between the shipping container 328 and its corresponding sensors 306-312. For example, the database 316 may include a two-dimensional table where the rows of the table include shipping containers (selectable via a unique shipping identifier), and the columns of the two-dimensional table identify whether the shipping container includes a corresponding sensor. Thus, when the client device 314 queries the database 316 via a SQL query (or the like) with a shipping container identifier, the client device 314 is provided with an indication as to the sensors associated with the corresponding shipping container. While the database 316 may be implemented as a relational database in one embodiment, the database 316 may be implemented in other formats as well including, but not limited to, a hierarchical database, one or more flat files, or any other type of database.

When a shipping container is selected, the user of the client device 314 may then designate which sensors are to be active during transit. In one embodiment, the client device 314 provides the sensor controller 304 sensor configuration data that includes which sensors are to be active during the transport of the shipping container 328. The sensor configuration data may also include specific transit information that indicates when the selected sensors 306-312 are to be active, such as GPS coordinates (e.g., a beginning GPS coordinate, an ending GPS coordinate, intermediary GPS coordinates, etc.) or time values (e.g., absolute or relative).

In addition to specifying which sensors 306-312 are to be active, the sensor configuration data may also include the various sensor thresholds for monitoring the interior and/or exterior of the shipping container 328. In one embodiment, the sensor thresholds are user-specified via the client device 314 such that the user uploads the sensor thresholds in the sensor configuration data. Alternatively, and/or additionally, the database 316 may further store the contents and/or type of contents being held by the shipping container 328, where contents or the type of contents are associated with sensors 306-312. The content types specify the characteristics of the contents being shipped via the shipping container 328, such as "frozen," "keep upright," "fragile," "time sensitive," and other such characteristics. Using the client device 314, the user can specify whether sensors 306-312 associated with the contents of the shipping container 328 or the content types are active during the transport of the shipping container 328. By specifying which sensors 306-312 are to be active during transport of the shipping container 328, the sensor controller 308 can more effectively regulate the power draw of the various sensors 306-312.

Another challenge posed in the arrangement illustrated in FIG. 3, is that the sensor controller 304 may not be able to connect to the network 324 without the proper credentials or network configuration information (e.g., IP address, port numbers, Service Set Identifier (SSID), and other such network configuration information). Accordingly, the client device 314 is also configured to communicate network configuration data to the sensor controller 304 that informs the sensor controller 304 as to how to connect to the network 324. In one embodiment, the network configuration information includes the SSID of the network 324 and the requisite login credentials (e.g., a username and/or password) to access the network 324. In another embodiment, the network configuration information includes a network certificate for the sensor controller 304 to authenticate with the network 324. The sensor controller 304 may reference the sensor configuration information to determine when the sensor controller 304 should attempt to access the network 324 using the network configuration information. In this manner, the sensor controller 304 may be configured with multiple sets of network configuration information, where each set of network configuration information corresponds to a set of sensor configuration information. In this manner, should the sensor controller 304 be mounted or affixed to a shipping container 328 intended for multiple destinations, the sensor controller 304 can connect to any one of the networks at such destinations.

Figure 4:
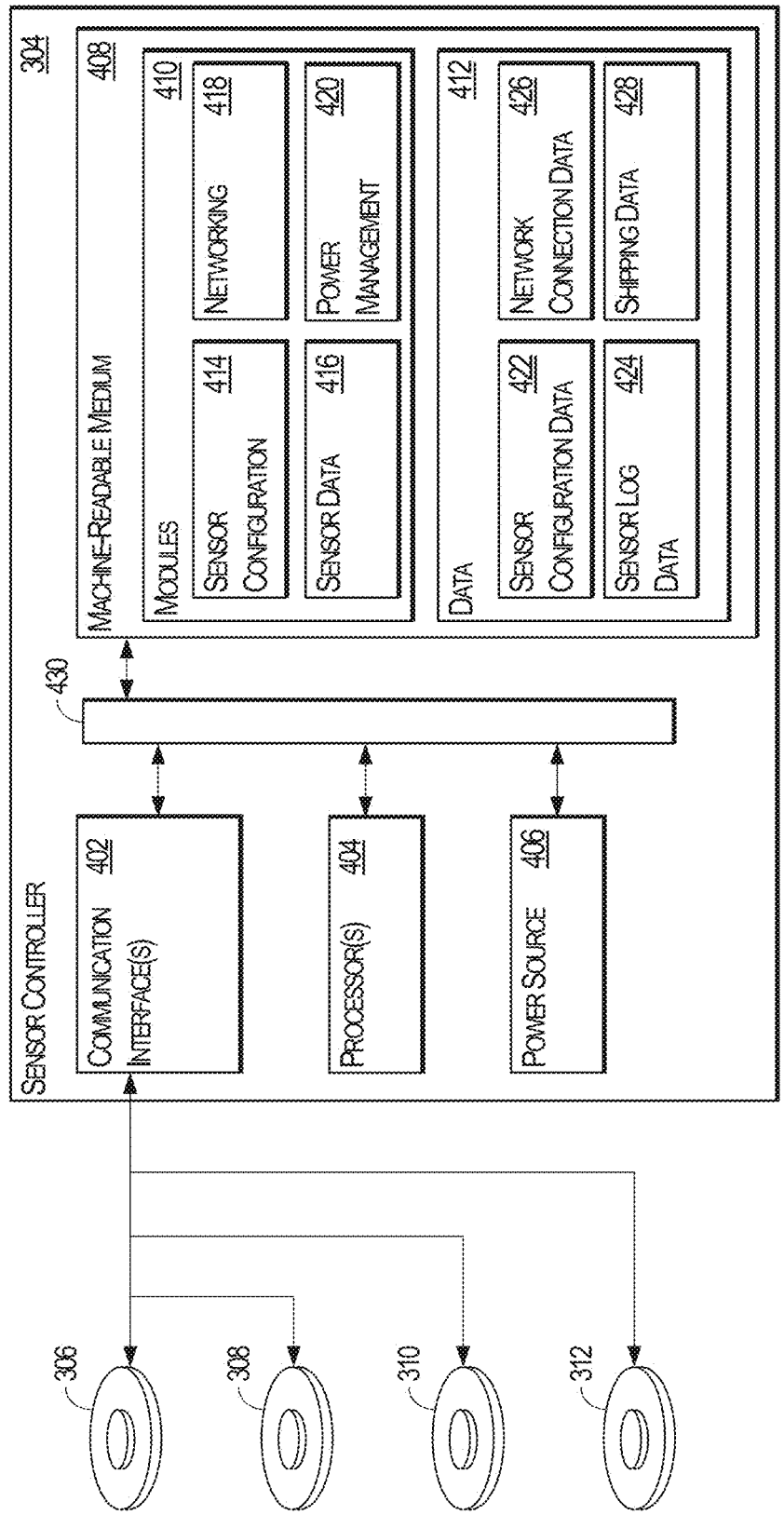
FIG. 4 illustrates a block diagram of the sensor controller of FIG. 3, according to an example embodiment.

FIG. 4 illustrates a block diagram of the sensor controller 304 of FIG. 3, according to an example embodiment. In one embodiment, the sensor controller 304 includes one or more communication interfaces(s) 402, one or more processor(s) 404, a power source 406 that powers, or provides power to, the sensor controller 304, and a machine-readable medium 408 that stores computer-executable instructions for one or more modules 410 and data 412 used to support one or more functionalities of the modules 410.

The various functional components of the sensor controller 304 may reside on a single device or may be distributed across several computers in various arrangements. The various components of the sensor controller 304, furthermore, may access one or more other components of the AMP 102 (e.g., one or more of the module 120-128, the IIoT machine 108, the communication gateway 114, or any of services available through the gateway 210), and each of the various components of the sensor controller 304 may be in communication with one another. The various components of the sensor controller 304 may also access one or more of the devices as illustrated in FIG. 3 (e.g., the client device 314, one or more of the sensors 306-312, the IIoT machines 318-320, and/or the database 316). Further, while the components of FIG. 4 are discussed in the singular sense, it will be appreciated that in other embodiments multiple instances of the components may be employed.

The one or more communication interfaces 402 are configured to facilitate communications between the sensor controller 304 and the sensors 306-312, the client device, 314, and/or the IIoT machines 318-320. The one or more communication interfaces 402 may include one or more wired interfaces (e.g., an Ethernet interface, Universal Serial Bus (USB) interface, a Thunderbolt® interface, etc.), one or more wireless interfaces (e.g., an IEEE 802.11b/g/n interface, a Bluetooth® interface, an IEEE 802.16 interface, etc.), or combinations of such wired and wireless interfaces.

The one or more processors 404 may be any type of commercially available processor, such as processors available from the Intel Corporation, Advanced Micro Devices, Texas Instruments, Qualcomm, or other such processors. Further still, the one or more processors 404 may include one or more special-purpose processors, such as a Field-Programmable Gate Array (FPGA) or an Application Specific Integrated Circuit (ASIC). The one or more processors 404 may also include programmable logic or circuitry that is temporarily configured by software to perform certain operations. Thus, once configured by such software, the one or more processors 404 become specific machines (or specific components of a machine) uniquely tailored to perform the configured functions and are no longer general-purpose processors.

The power source 406 provides electrical power to the various components of the sensor controller 304. The power source 406 may provide alternating current (AC) or direct current (DC) to the sensor controller 304. Further still, the power source 406 may be electrically connected to one or more of the sensors 306-312 such that the power source 406 also provides electrical power to the sensors 306-312. Alternatively, and/or additionally, the sensors 306-312 each have their own power source (not shown). Examples of power sources include a battery, photovoltaic cells, wind turbines, and other such power sources.

A communication bus 430 facilitates communications between the various components 402-408 of the sensor controller 304. Using the communication bus 430, the one or more processor(s) 404 store information to the machine-readable medium 408 that is received from the one or more communication interface(s) 402. Similarly, the one or more processor(s) 404 retrieve information from the machine-readable medium 408 via the communication bus 430 and can communicate such information to one or more devices communicatively coupled to the one or more communication interface(s) 402. In this manner, the communication bus 430 provides one or more channels through which information can be communicated among the various components 402-408 of the sensor controller 304.

The machine-readable medium 408 includes various modules 410 and data 412 for implementing the sensor controller 304. The machine-readable medium 408 includes one or more devices configured to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM) and/or any suitable combination thereof. The term "machine-readable medium" should be taken to include a single medium or multiple media (e.g., a centralized or distributed database, or associated caches and servers) able to store the modules 410 and the data 412. Accordingly, the machine-readable medium 408 may be implemented as a single storage apparatus or device, or, alternatively and/or additionally, as "cloud-based" storage systems or storage networks that include multiple storage apparatus or devices. As shown in FIG. 4, the machine-readable medium 408 excludes signals per se.

In one embodiment, the modules 410 are written in a computer-programming and/or scripting language. Examples of such languages include, but are not limited to, C, C++, C#, Java, JavaScript, Perl, Python, or any other computer programming and/or scripting language now known or later developed.

With reference to FIG. 4, the modules 410 of the sensor controller 304 include, but are not limited to, a sensor configuration module 414, a sensor data module 416, a networking module 418, and a power management module 420. The data 412 referenced and used by the modules 410 include sensor configuration data 422, sensor log data 424, network connection data 426, and shipping data 428.

The sensor configuration module 414 facilitates interactions between the sensor controller 304 and the sensors 306-312. In one embodiment, the sensor controller 304 invokes or executes the sensor configuration module 414 to configure one or more of the sensors 306-312 according to the sensor configuration data 422. As discussed above with reference to FIG. 3, the sensor configuration data 422 may be provided by the client device 314 via the network 322. The sensor configuration data 422 informs the sensor controller 304 which of the sensors 306-312 are to be active during transit of the shipping container 328 or, if applicable, which of the sensors 306-312 are to be active during selected portions of the journey from the origin location to the destination location. Accordingly, the sensor controller 304 may also engage the power management module 422 to regulate which of the sensors 306-312 are active according to the sensor configuration data 422.

The sensor data module 416 is configured to receive and transform sensor data received from the various sensors 306-312. In one embodiment, the sensor data is received as raw data, which the sensor data module 416 then transforms into a human-readable format. In this embodiment, the human-readable formatted version of the sensor data is as the sensor log data 424. In transforming the received sensor data, the sensor data module 416 may reference a clock (not shown) to associate a time with the received sensor data. This allows a user who accesses the sensor log data 424 to identify a potential time when a problem may have occurred during transport of the shipping container 328. As another example, the sensor data module 416 may reference a GPS sensor (e.g., one of the sensors 306-312) and associate one or more GPS coordinates with the received sensor data. Similarly, this allows a user to identify a potential location when a problem may have occurred during transport of the shipping container 328. Further still, the sensor data module 416 may format received sensor data so that it is logically structured (e.g., organized in one or more columns and/or one or more rows)

As discussed above with reference to FIG. 3, the sensor configuration data 422 may include various sensor data thresholds for each of the sensors 306-312. In one embodiment, one or more the sensors 306-312 communicates an alarm or other indication to the sensor controller 304 when corresponding sensor data is outside the sensor data thresholds. In this embodiment, the alarm or other indication may be recorded by the sensor data module 416 in the sensor log data 424. Alternatively, and/or additionally, the sensor data module 416 may compare the received sensor data with the sensor data thresholds of the sensor configuration data 422, and record that received sensor data as being outside the corresponding sensor data thresholds in the sensor log data 424. With the sensor data module 416 correlating the received sensor data with a time value and/or GPS coordinates, the alarm or other indication can be used to further identify where a potential problem may be in the transit of the shipping container 328 from the origin location to the destination location.

The networking module 418 is configured to facilitate network access to the networks 322,324 by the sensor controller 304. In one embodiment, the network module 418 references the network connection data 426, which includes relevant networking information for connecting the sensor controller 304 to the networks 322,324. Such networking connection data 426 includes, but is not limited to, one or more SSIDs, a network connection port (e.g., 21, 80, 443, etc.), a username and/or password, an authentication certificate for authenticating the sensor controller 304 with the networks 322,324, and other such networking information or combination of networking information. To communicate with the network 324, the networking module 418 may leverage one or more communication interface(s) 402 communicatively coupled to the machine-readable medium 408 via the communication bus 430.

In addition, as the sensor controller 304 is designed to be self-sufficient, the networking module 418 may reference shipping data 428 in determining when the sensor controller 304 is to be connected to the network 324 located at the destination location. In one embodiment, the shipping data 428 includes an approximated date and/or time when the shipping container 328 is expected to reach the destination location. In this embodiment, the networking module 418 compares the approximate date and/or time of the shipping data 428 with a reference clock (not shown) to determine whether the shipping container 328 has reached the destination location. In another embodiment, the shipping data 428 includes one or more GPS coordinates indicating the destination location. In this embodiment, the networking module 418 compares GPS coordinates obtained from one or more the sensors 306-312 with the one or more GPS coordinates of the shipping data 428 to determine whether the shipping container 328 has reached its destination location. Combinations of the foregoing embodiments are also possible, such as where the shipping data 428 includes both GPS coordinates of the destination location and an approximated date and/or time when the shipping container 328 is expected to reach the destination location.

Where the networking module 418 makes a determination that the shipping container 328 has reached its destination location (even if, in fact, the shipping container 328 has not actually reached the destination location), the networking module 418 is configured to attempt a connection to the network 324 using the provided network connection data 426. The network connection data 426 may further include a timeout or other timing interval that instructs the networking module 418 how often to attempt a connection to the network 324 or how frequently the networking module 418 is to attempt a connection to the network 324. In this manner, should the shipping container 328 have not actually reached the destination location, the timing interval and/or timeout of the network connection data 426 prevents the networking module 418 from continuously attempting to connect to the network 324, which could result in the sensor controller 304 losing power (e.g., from draining the power source 406).

The power management module 420 is configured to manage the power of the sensor controller 304 and, where applicable, the connected sensors 306-312. In one embodiment, the sensors 306-312 and the sensor controller 304 are connected to a shared power source (e.g., power source 406), which is managed by the sensor controller 304. In this embodiment, the power management module 420 is configured to manage which sensors 306-312 receive power from the power source 406. Alternatively, and/or additionally, the sensors 306-312 are powered by an independent power source, such as where each of the sensors 306-312 have their own batteries. In this instance, the power management module 420 may manage the power draw by the sensor controller 304.

Figure 5A:
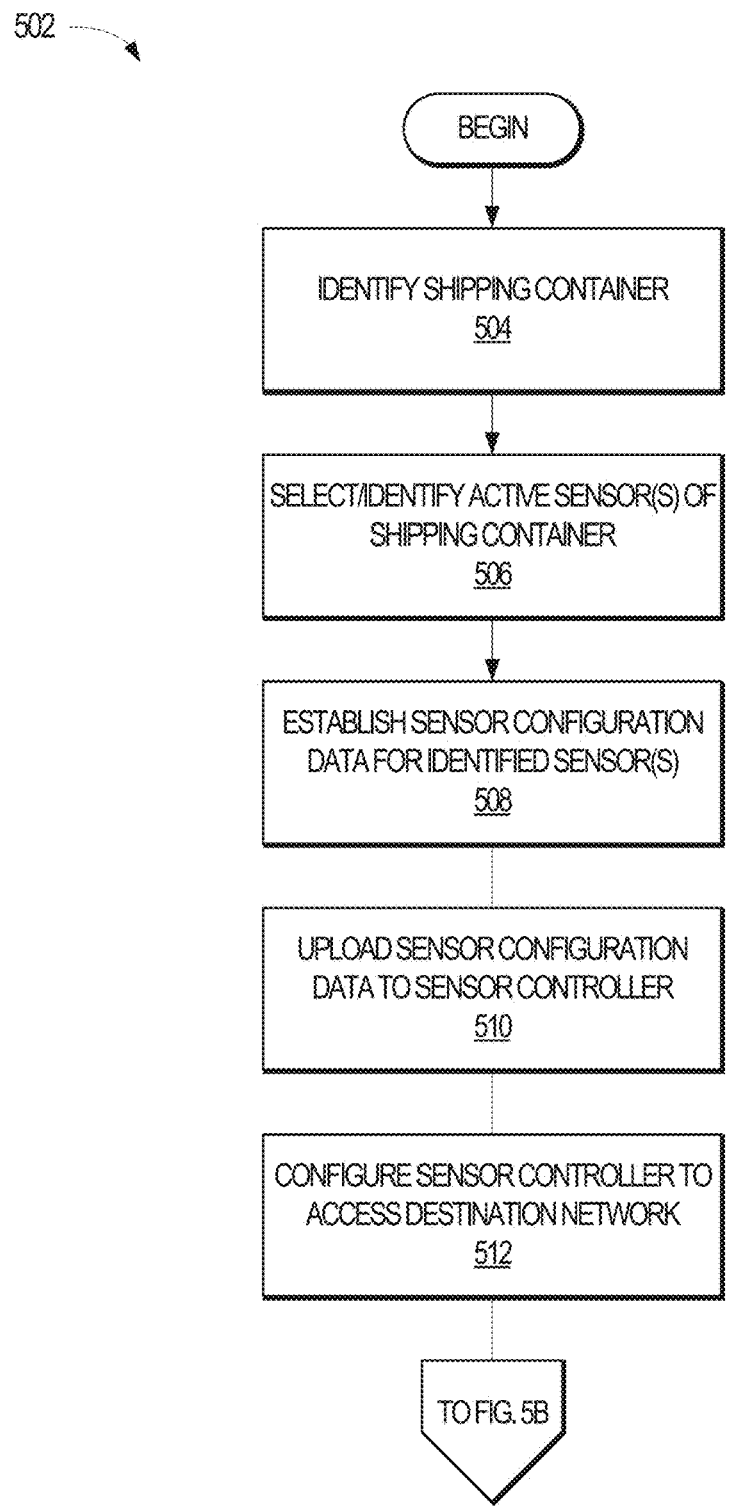
FIGS. 5A-5B illustrate a method, according to an example embodiment, for configuring one or more sensors communicatively coupled to the sensor controller of FIG. 3.
Figure 5B:
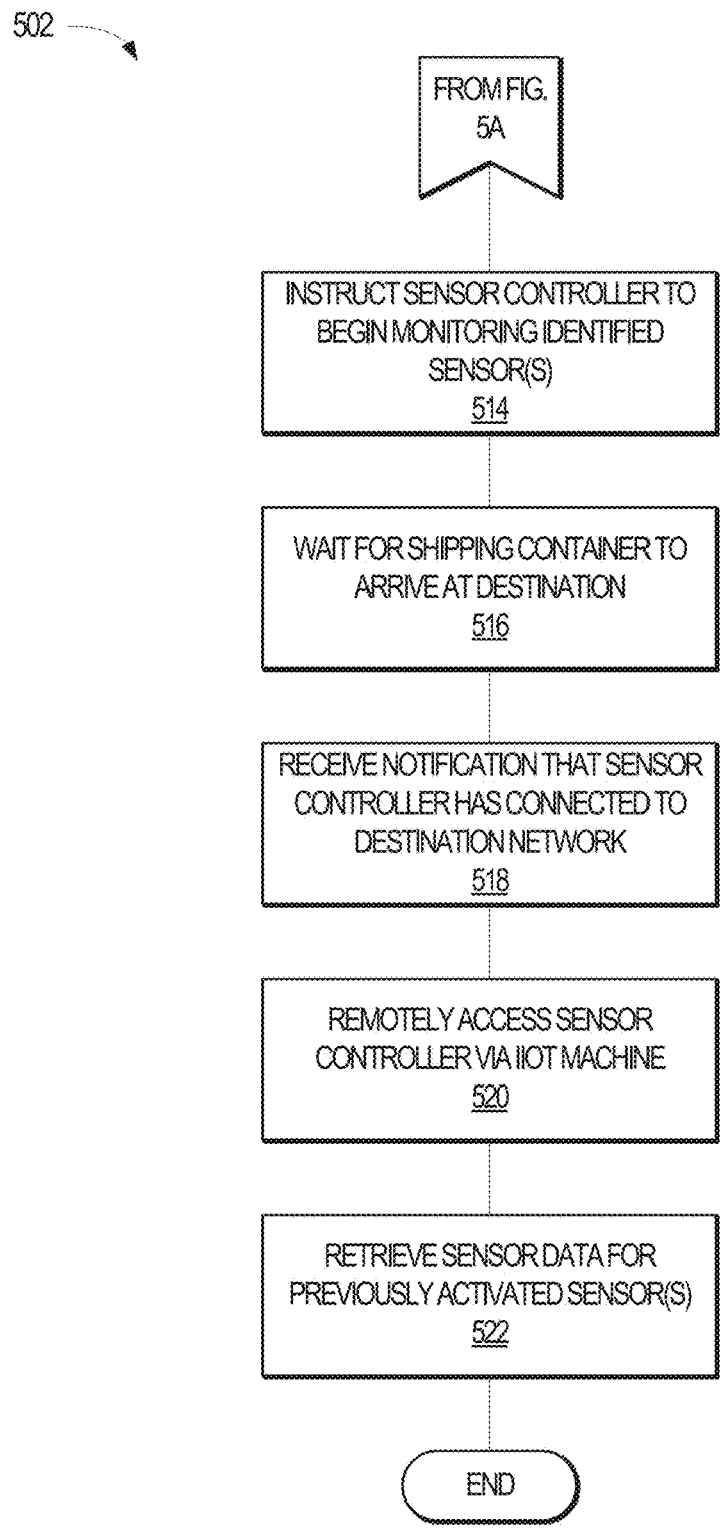

FIGS. 5A-5B illustrate a method 502, according to an example embodiment, for configuring one or more sensors 306-312 communicatively coupled to the sensor controller 304 of FIG. 3. The method 502 may be implemented by one or more of the devices illustrated in FIG. 3 and is discussed by way of reference thereto.

With reference to FIG. 5A and FIG. 3, a user of the client device 314 identifies a shipping container (e.g., shipping container 328) for configuring the sensors affixed or mounted thereto (e.g., sensors 306-312) (Operation 504). As explained previously, the client device 314 may be in communication with a database 316, which includes associations between sensors and their corresponding shipping containers. Using the client device 314, the user then selects one or more of the sensors 306-312 to be active during the transit of the shipping container 328 (Operation 506). The user may then establish various thresholds of expected measurements for the sensors 306-312. The selected sensors 306-312 and the various thresholds form a portion of the sensor configuration data (Operation 508). The user then communicates (e.g., uploads) the established sensor configuration data to the sensor controller 304 (Operation 510). As explained with reference to FIG. 4, the sensor controller 304 may then store this configuration data as the sensor configuration data 422.

The user then configures the sensor controller 304 to access a network located a destination location (e.g., network 324) (Operation 512). As discussed above, such configuration may include one or more SSIDs, one or more port numbers, one or more username and/or passwords, and/or one or more authentication certificates. The client device 314 then communicates this network configuration information to the sensor controller 304, which stores such information as the network connection data 426.

Referring to FIG. 5B, the client device 314 then instructs the sensor controller 304 to become active and/or to start monitoring the active sensors (e.g., one or more sensors selected from sensors 306-312) (Operation 514). The sensor controller 304 then receives measured sensor data as the shipping container 328 is shipped from the origin location to the destination location. During this time, the sensor controller 304 may be out communication with the client device 314. Accordingly, the client device 314 waits for the shipping container 328 to arrive at the destination location (Operation 516).

When the shipping container 328 arrives at its destination location, the sensor controller 304 may attempt to connect to the network located at the destination location (e.g., network 324) based on the previously-provided network connection data 426. Should the sensor controller 304 successfully connect to the network 324, the IIoT machine 320 may detect that the sensor controller 304 has joined the network 324 (e.g., the sensor controller 304 sends a broadcast message announcing its presence to other devices connected to the network 324). Upon detection of the sensor controller 304, the IIoT machine 320 may then communicate a notification to the client device 314 via the network 326, the IIoT machine 318, and/or the network 322 that the sensor controller 304 has connected to the network 324. Accordingly, the client device 314 receives the notification that the sensor controller 304 has connected to the destination network 324 (Operation 518).

The client device 314 then accesses the sensor controller 304 via the machines 118,120 and networks 322-326 (Operation 520). Using this access, the client device 314 then retrieves the sensor log data (e.g., sensor log data 424) prepared by the sensor data module 416 (Operation 522). The sensor log data is then communicated to the client device 314, which the user of the client device 314 can view and/or manipulate in order to understand the types of weather and/or environmental conditions that the shipping container 328 (or the contents stored therein) may have been subjected to.

Figure 6A:
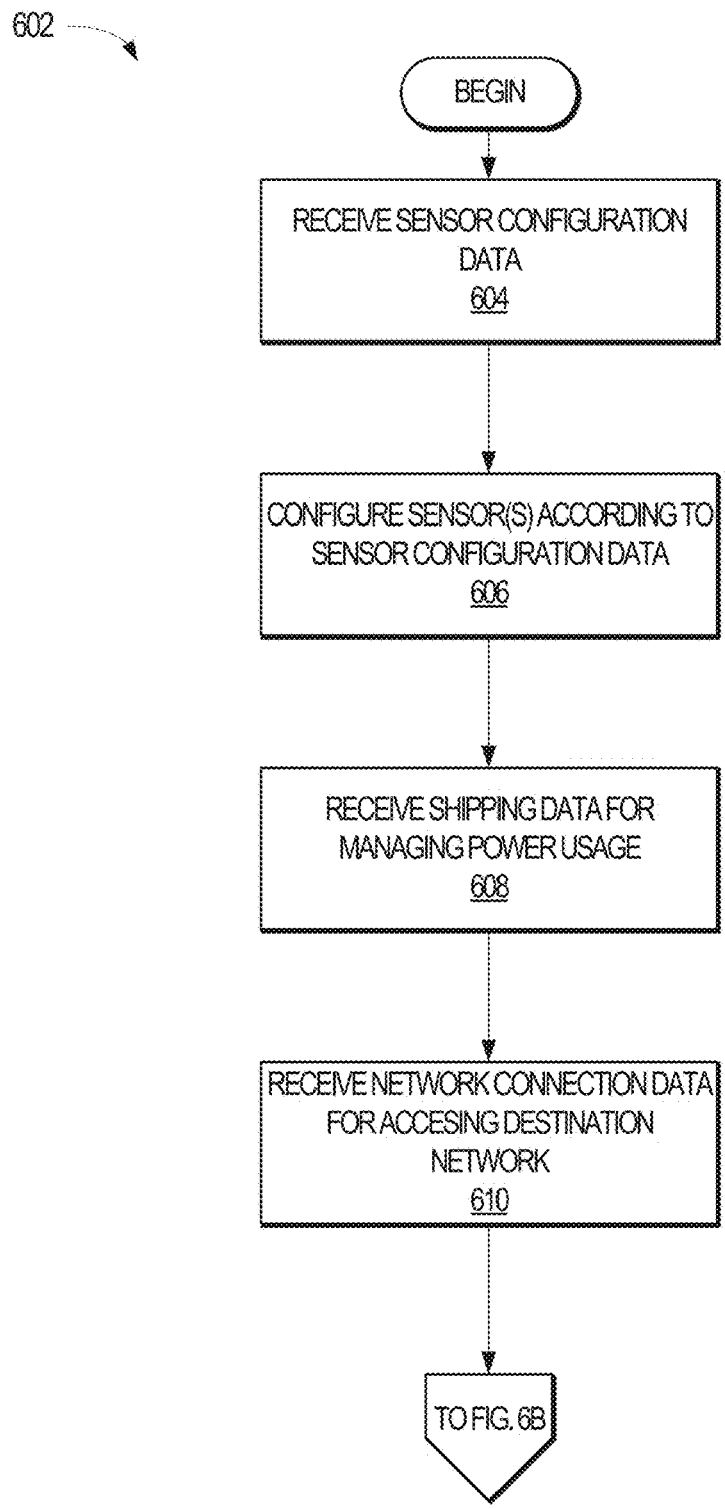
FIGS. 6A-6C illustrate a method, according to an example embodiment, of the sensor controller of FIG. 3 configuring one or more sensors.
Figure 6B:
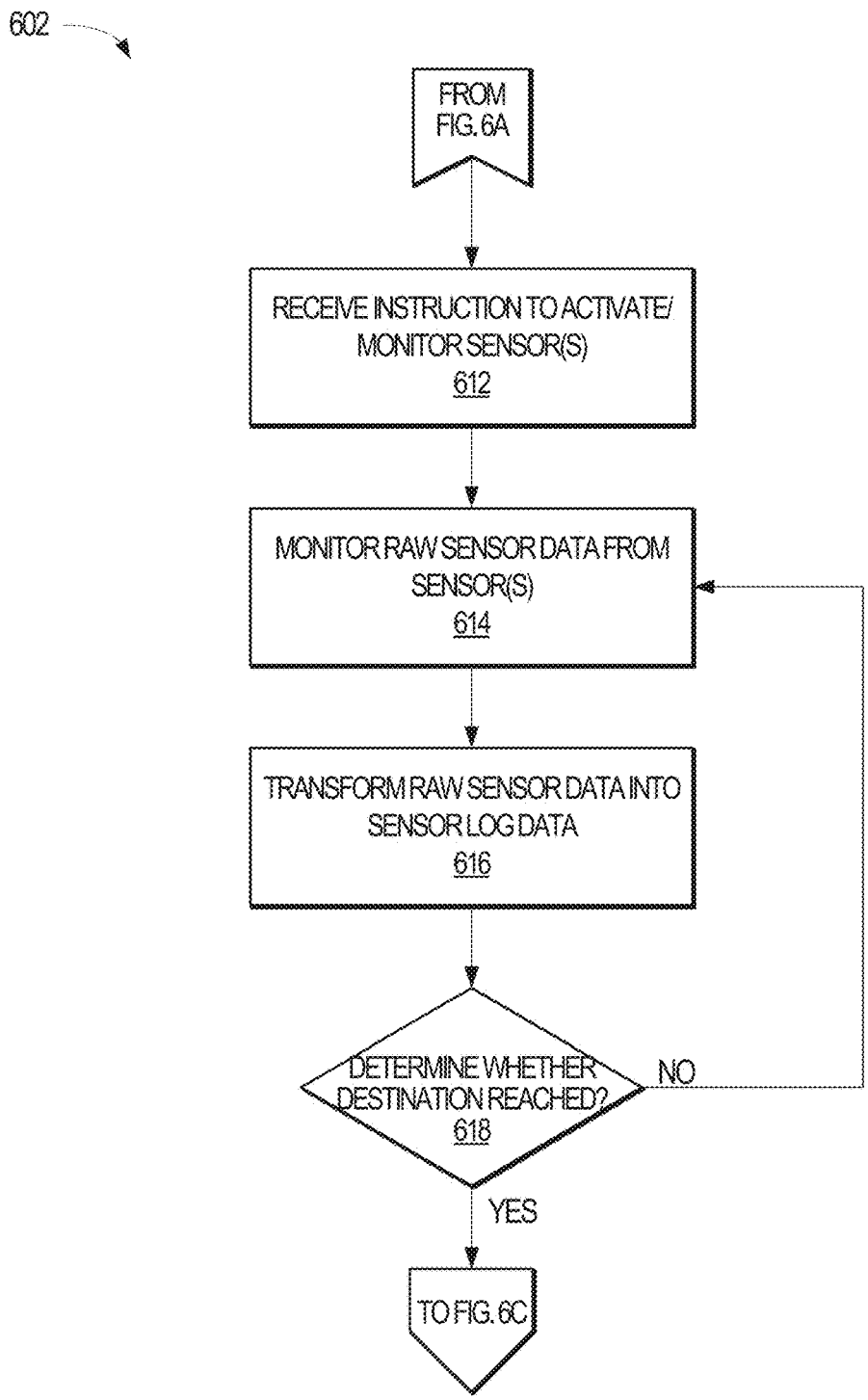
Figure 6C:
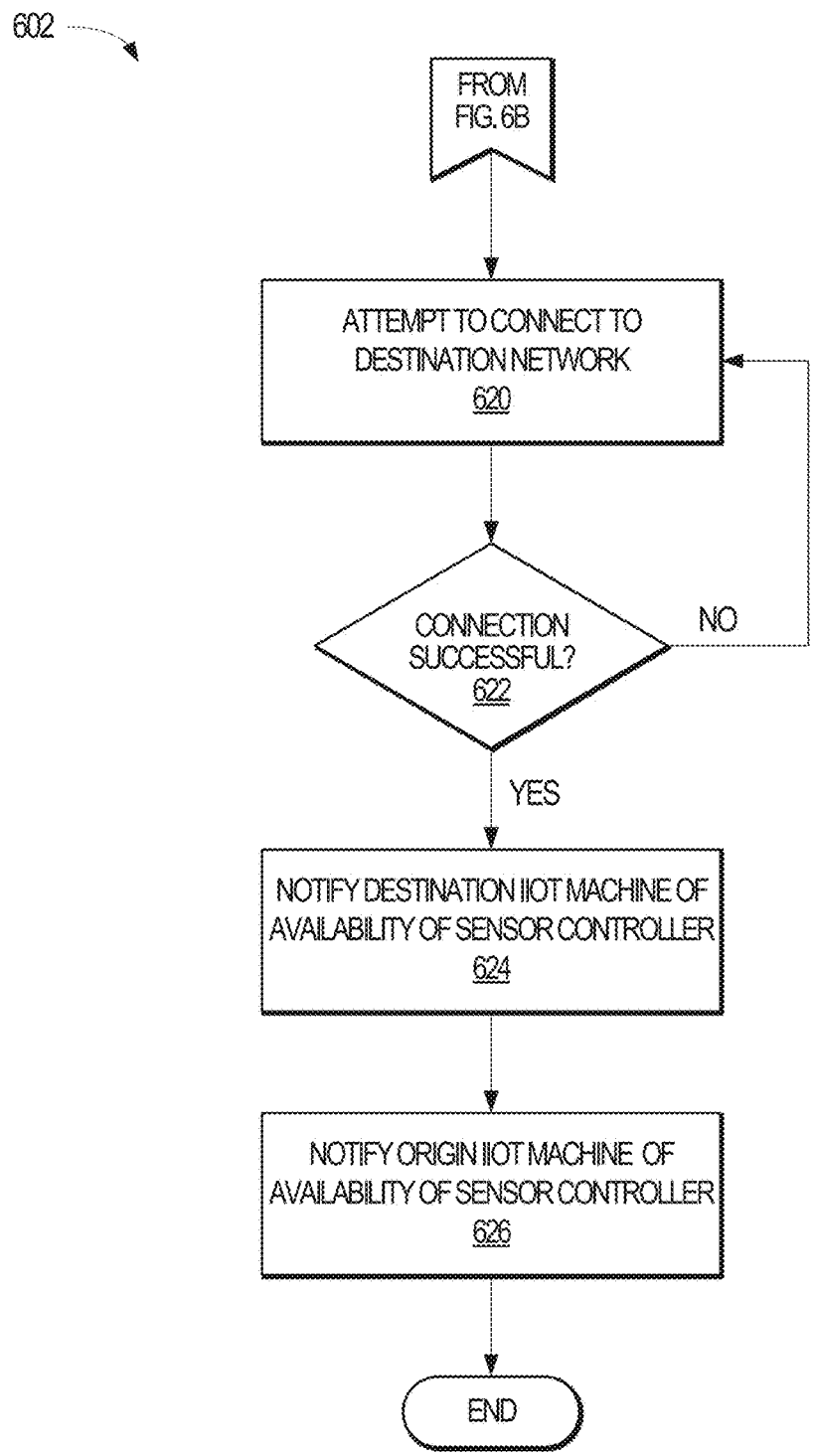

FIGS. 6A-6C illustrate a method 602, according to an example embodiment, of the sensor controller of FIG. 3 configuring one or more of the sensors 306-312. The method 602 may be implemented by one or more of the components 402-430 of the sensor controller 304 and is discussed by way of reference thereto.

Referring initially to FIG. 6A, the sensor controller 304 receives sensor configuration data (e.g., the sensor configuration data 422) for configuring one or more of the sensors 306-312 (Operation 604). As explained above, a user of the client device 314 may configure one or more of the sensors 306-312 to be active during the transit of the shipping container 328, and can upload this sensor configuration data to the sensor controller 304. Accordingly, the sensor controller 304 then configures the sensors 306-312 using the received sensor configuration data (Operation 606). The sensor controller 304 then receives shipping data (e.g., stored as shipping data 428) that identifies when the shipping container 328 is expected to reach the destination location (Operation 608). As explained previously, the shipping data 428 may include such information as one or more GPS coordinates, one or more time values, a counter that counts relative to when the shipping container 328 left the origin location, and other such shipping data. Furthermore, such shipping data 428 may be used to manage power consumption by one or more of the sensors 306-312 and/or by the sensor controller 304 itself (e.g., via the power management module 420).

The sensor controller 304 also receives network connection data that instructs the sensor controller 304 how to connect to one or more destination networks (e.g., network 324) (Operation 610). The received network connection data is stored as the network connection data 426. Using the network connection data 426 in conjunction with the shipping data 428, the sensor controller 304 can connect to one or more destination networks according to the shipping schedule of the shipping container 328.

Referring to FIG. 6B, the sensor controller 304 then receives an instruction to activate, and/or begin monitoring, one or more of the sensors 306-312 (Operation 612). During this time, the sensor controller 304 is configured to receive raw sensor data (or other types of sensor data, e.g., formatted sensor data) from one or more of the monitored sensors 306-312 via the sensor data module 416 (Operation 614). Where the received sensor data is raw data, the sensor data module 416 is configured to transform the raw data into sensor log data (Operation 616). As discussed above, the sensor data module 416 may transform the raw data by associating one or more of the measurements with a time value and/or one or more UPS coordinates, arranging the raw data into a human-readable format (e.g., one or more rows and/or columns), identifying or flagging particular measurements should such measurements fall outside corresponding thresholds, and other such operations or combination of operations.

During transit of the shipping container 328, the sensor controller 304 determines whether the shipping container 328 has reached a designated destination location (Operation 618). As explained previously, the sensor controller 304 may perform this determination by referencing the shipping data 428 and comparing one or more values of the shipping data 428 with one or more values obtainable by the sensor controller 304. Where the sensor controller 304 determines that the shipping container 328 has not yet reached a destination location (e.g., the "NO" branch of Operation 618), the sensor controller 304 continues monitoring the selected sensors 306-312 (Operation 614). Where the sensor controller 304 determines that the shipping container 328 has reached its destination location (e.g., the "YES" branch of Operation 618), the method proceeds to Operation 620 of FIG. 6C.

Referring to FIG. 6C, the sensor controller 304 next attempts to connect to the network 324 located at the destination location (Operation 620). As explained above with reference to FIG. 4, the sensor controller 304 is configured to invoke the networking module 418 to connect to the network 324 using the network connection data 426. Where the sensor controller 304 is unable to connect to the network 324 (e.g., the "NO" branch of 622), the method 602 returns to Operation 620, where the sensor controller 304 attempts to connect to the network 324. The sensor controller 304 may continue its attempts in trying to connect to network 324 until a network connection condition is satisfied, such as that the sensor controller 304 has connected to the network 324, that a timeout period has been reached (e.g., 5 minutes), or that a number of connection attempts has been reached (e.g., 50 connection attempts).

Where the sensor controller 304 successfully connects to the network 324 (e.g., the "YES" branch of Operation 622), the sensor controller 304 notifies the IIoT machine 320 of its availability (Operation 624). In one embodiment, the sensor controller 304 may send a broadcast message announcing its presence on the network 324, which the IIoT machine 320 is configured to recognize. Additionally, and/or alternatively, the sensor controller 304 communicates a notification message to the IIoT machine 320 specifically (e.g., by referencing an IP address of the IIoT machine 320 stored with the network connection data 426). Thereafter, the IIoT machine 320 and/or the sensor controller 304 may communicate a message to the IIoT machine 318, notifying the IIoT machine 318 that the sensor controller 304 has connected to the network 324 and/or arrived at its destination location (Operation 626). The IIoT machine 318 may then notify the client device 314 that the sensor controller 304 is available for retrieving the sensor log data acquired by the sensor controller 304.

In this manner, the disclosed systems, methods, and computer-readable mediums describe and explain a sensor controller 304 that is accessible via one or more interconnected IIoT machines 322,324. Furthermore, the sensor controller 304 may be configured to activate one or more sensors 306-312 according to a configuration provided by a client device 314. Because the sensor controller 304 is configured for network access at a destination network 324, a user at the client device 314 can retrieve and/or view sensor log data acquired by the sensor controller 304 during its transit from an origin location to a destination location. Thus, a few of the technical benefits provided by this disclosure include: 1) remotely accessing a sensor controller 304 that would otherwise be inaccessible; 2) configuring which sensors 306-312 are to be active during transit of the shipping container 328, which would otherwise result in a consumption of limited resources; and 3) an automatic mechanism that the sensor controller 304 employs to connect to a remote network without intervention by the user of the client device 314. These technical benefits address specific technical problems that arise in the field of transport and shipping logistics, and provide benefits both to the owners of the contents that are being shipped and to the organization hired to perform the shipping.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a FPGA or an ASIC. A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-6C are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Example Machine Architecture and Machine-Readable Medium

Figure 7:
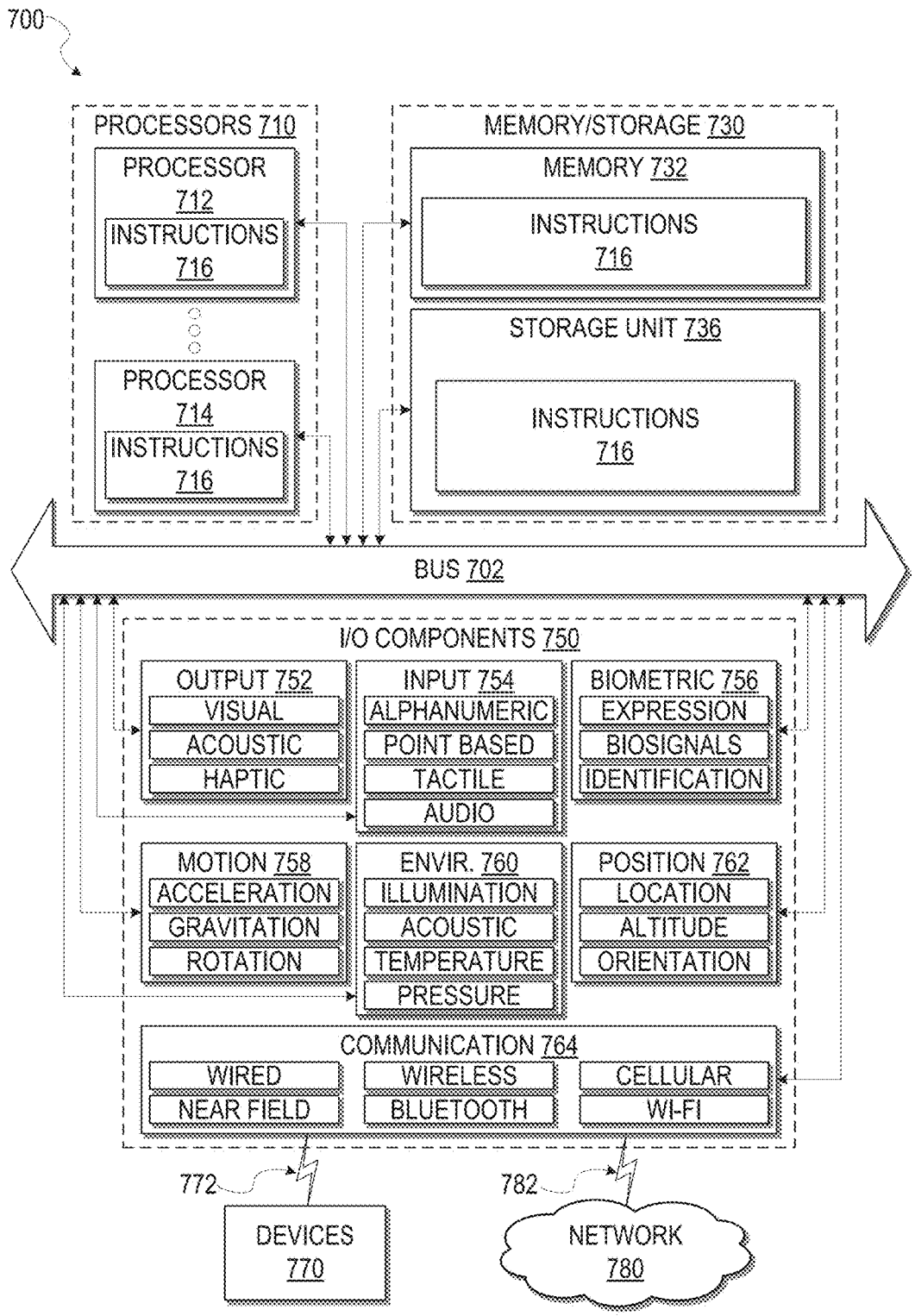
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an apples, an app, or other executable code) for causing the machine 700 to perform any one or more of the methodologies discussed herein may be executed. For example, the instructions 716 may cause the machine 700 to execute the flow diagrams of FIGS. 5A-6C. Additionally, or alternatively, the instructions 716 may implement one or more of the components of FIGS. 1-4. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a PDA, or any machine capable of executing the instructions 716, sequentially or otherwise, that specify actions to be taken by machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory/storage 730, and I/O components 750, which may be configured to communicate with each other such as via a bus 702. In an example embodiment, the processors 710 (e.g., a Central Processing Unit (CPU), a Reduced Instruction Set Computing (RISC) processor, a Complex instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 712 and processor 714 that may execute the instructions 716. The term "processor" is intended to include multi-core processor that may comprise two or more independent processors (sometimes referred to as "cores") that may execute instructions 716 contemporaneously. Although FIG. 7 shows multiple processors 710, the machine 700 may include a single processor with a single core, a single processor with multiple cores (e.g., a multi-core process), multiple processors with a single core, multiple processors with multiples cores, or any combination thereof.

The memory/storage 730 may include a memory 732, such as a main memory, or other memory storage, and a storage unit 736, both accessible to the processors 710 such as via the bus 702. The storage unit 736 and memory 732 store the instructions 716 embodying any one or more of the methodologies or functions described herein. The instructions 716 may also reside, completely or partially, within the memory 732, within the storage unit 736, within at least one of the processors 710 (e.g., within the processor's cache memory), or any suitable combination thereof, during execution thereof by the machine 700. Accordingly, the memory 732, the storage unit 736, and the memory of processors 710 are examples of machine-readable media.

As used herein, "machine-readable medium" means a device able to store instructions 716 and data temporarily or permanently and may include, but is not limited to, RAM, ROM, buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a LED display, a LCD, a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762 among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 762 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via coupling 782 and coupling 772, respectively. For example, the communication components 764 may include a network interface component or other suitable device to interface with the network 780. In further examples, communication components 764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include Radio Frequency Identification (MD) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF416, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 780 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network and the coupling 782 may be a Code Division Multiple Access (CDMA) connection, a Global System for Mobile communications (GSM) connection, or other type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 716 may be transmitted or received over the network 780 using a transmission medium via a network interface device (e.g., a network interface component included in the communication components 764) and utilizing any one of a number of well-known transfer protocols HTTP). Similarly, the instructions 716 may be transmitted or received using a transmission medium via the coupling 772 (e.g., a peer-to-peer coupling) to devices 770. The term "transmission medium" shall be taken to include any intangible medium that is capable of storing, encoding, or carrying instructions 716 for execution by the machine 700, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A sensor controller for managing one or more sensors in communication with the sensor controller, the sensor controller comprising:
   a machine-readable medium storing computer-executable instructions; and
   at least one hardware processor communicatively coupled to the machine-readable medium that, when the computer-executable instructions are executed, configures the sensor controller to perform operations comprising:
   receiving sensor configuration data via a first network located at a first geographic location, the sensor configuration data specifying one or more sensors to be active during transit from the first geographic location to a second geographic location;
   receiving network connection data specifying one or more network credentials for connecting to a second network located at a second geographic location;
   monitoring the one or more sensors specified as active by the sensor configuration data;
   receiving sensor data from the monitored one or more sensors;
   connecting to the second network in response to a determination that the second geographic location has been reached; and
   transmitting the received sensor data to a client device communicatively coupled to the first network.

2. The system of claim 1, where the operations further comprise:
   communicating with a first Internet of Things (IIoT) machine located at the second geographic location and communicatively coupled to the second network, the first IIoT machine acting as an intermediary between the client device and the sensor controller.

3. The system of claim 1, wherein the received sensor data comprises raw sensor data, and the operations further comprise:
   transforming the raw sensor data into sensor log data, the sensor log data being formatted differently than the raw sensor data; and
   transmitting the sensor log data as the received sensor data to the client device.

4. The system of claim 1, wherein the operations further comprise:
   determining that the second geographic location has been reached based on a comparison of previously stored GPS coordinates with a set of GPS coordinates obtained from one or more of the sensors communicatively coupled to the sensor controller.

5. The system of claim 1, wherein the receiving sensor configuration data further comprises communicating with a second IIoT machine at the first network, the second IIoT machine acting as an intermediary between the sensor controller and the client device.

6. The system of claim 1, wherein monitoring the one or more sensors comprises monitoring a first plurality of sensors selected from the one or more sensors during a first interval of the transit from the first geographic location to the second geographic location and monitoring a second plurality of sensors selected from the one or more sensors during a second interval of the transit from the first geographic location to the second geographic location, the first and second plurality of sensors being specified by the sensor configuration data.

7. The system of claim 1, wherein:
   the sensor controller is affixed to a container;
   the sensor controller is configured to perform the receiving of the sensor configuration data when the container is located at the first geographic location; and
   the sensor controller is configured to perform the connecting to the second network when the container is located at the second geographic location.

8. A method for managing one or more sensors in communication with a sensor controller, the method comprising:
   receiving sensor configuration data at a first network located at a first geographic location, the sensor configuration data specifying one or more sensors to be active during transit from the first geographic location to a second geographic location;
   receiving network connection data specifying one or more network credentials for connecting to a second network located at a second geographic location;
   monitoring the one or more sensors specified as active by the sensor configuration data;
   receiving sensor data from the monitored one or more sensors;
   connecting to the second network in response to a determination that the second geographic location has been reached; and
   transmitting the received sensor data to a client device communicatively coupled to the first network.

9. The method of claim 8, where the method further comprises:
   communicating with a first Internet of Things (IIoT) machine located at the second geographic location and communicatively coupled to the second network, the first IIoT machine acting as an intermediary between the client device and the sensor controller.

10. The method of claim 8, wherein the received sensor data comprises raw sensor data, and the method further comprises:
    transforming the raw sensor data into sensor log data, the sensor log data being formatted differently than the raw sensor data; and
    transmitting the sensor log data as the received sensor data to the client device.

11. The method of claim 8, wherein the method further comprises:

determining that the second geographic location has been reached based on a comparison of previously stored GPS coordinates with a set of GPS coordinates obtained from one or more of the sensors communicatively coupled to the sensor controller.

12. The method of claim 8, wherein the receiving sensor configuration data further comprises communicating with a second IIoT machine at the first network, the second IIoT machine acting as an intermediary between the sensor controller and the client device.

13. The method of claim 8, wherein monitoring the one or more sensors comprises monitoring a first plurality of sensors selected from the one or more sensors during a first interval of the transit from the first geographic location to the second geographic location and monitoring a second plurality of sensors selected from the one or more sensors during a second interval of the transit from the first geographic location to the second geographic location, the first and second plurality of sensors being specified by the sensor configuration data.

14. The method of claim 8, wherein:
the sensor controller is affixed to a container;
the receiving of the sensor configuration data is performed when the container is located at the first geographic location; and
the connecting to the second network is performed when the container is located at the second geographic location.

15. A machine-readable medium storing computer-executable instructions that, when executed by at least one hardware processor communicatively coupled to the machine-readable medium that, configures a sensor controller to perform operations comprising:
receiving sensor configuration data at a first network located at a first geographic location, the sensor configuration data specifying one or more sensors to be active during transit from the first geographic location to a second geographic location;
receiving network connection data specifying one or more network credentials for connecting to a second network located at a second geographic location;
monitoring the one or more sensors specified as active by the sensor configuration data;
receiving sensor data from the monitored one or more sensors;
connecting to the second network in response to a determination that the second geographic location has been reached; and
transmitting the received sensor data to a client device communicatively coupled to the first network.

16. The machine-readably:medium of claim 15, where the operations further comprise:
communicating with a first Internet of Things (IIoT) machine located at the second geographic location and communicatively coupled to the second network, the first IIoT machine acting as an intermediary between the client device and the sensor controller.

17. The machine-readable medium of claim 15, wherein the received sensor data comprises raw sensor data, and the operations further comprise:
transforming the raw sensor data into sensor log data, the sensor log data being formatted differently than the raw sensor data; and
transmitting the sensor log data as the received sensor data to the client device.

18. The machine-readable medium of claim 15, wherein the operations further comprise:
determining that the second geographic location has been reached based on a comparison of previously stored GPS coordinates with a set of GPS coordinates obtained from one or more of the sensors communicatively coupled to the sensor controller.

19. The machine-readable medium of claim 15, wherein the receiving sensor configuration data further comprises communicating with a second IIoT machine at the first network, the second IIoT machine acting as an intermediary between the sensor controller and the client device.

20. The machine-readable medium of claim 15, wherein monitoring the one or more sensors comprises monitoring a first plurality of sensors selected from the one or more sensors during a first interval of the transit from the first geographic location to the second geographic location and monitoring a second plurality of sensors selected from the one or more sensors during a second interval of the transit from the first geographic location to the second geographic location, the first and second plurality of sensors being specified by the sensor configuration data.

* * * * *